United States Patent
Nakaya et al.

(10) Patent No.: US 7,920,300 B2
(45) Date of Patent: *Apr. 5, 2011

(54) IMAGE-INPUT DEVICE

(75) Inventors: Fumio Nakaya, Kanagawa (JP);
Hirokazu Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1409 days.

This patent is subject to a terminal disclaimer.

(21) Appl. No.: 11/389,093

(22) Filed: Mar. 27, 2006

(65) Prior Publication Data

US 2006/0215238 A1    Sep. 28, 2006

(30) Foreign Application Priority Data

Mar. 28, 2005   (JP) .................................. 2005-091807

(51) Int. Cl.
*H04N 1/04* (2006.01)

(52) U.S. Cl. ........ 358/474; 358/475; 358/509; 358/520; 382/275; 382/274; 382/254; 359/729

(58) Field of Classification Search .................. 358/474, 358/509, 475, 1.9, 520, 505, 497, 468; 382/318, 382/319, 274, 275; 250/226, 214 G, 214 R; 359/729

See application file for complete search history.

(56) References Cited

U.S. PATENT DOCUMENTS

| 7,256,781 | B2* | 8/2007 | Shioya | 345/426 |
| 7,327,450 | B2* | 2/2008 | Kreh et al. | 356/237.5 |
| 7,336,431 | B2* | 2/2008 | Ichikawa et al. | 359/726 |
| 7,397,565 | B2* | 7/2008 | Nakaya et al. | 356/446 |
| 7,531,789 | B2* | 5/2009 | Nakaya et al. | 250/226 |
| 7,561,758 | B2* | 7/2009 | Huang | 382/312 |
| 7,586,595 | B2* | 9/2009 | Okamoto | 356/237.2 |
| 7,602,483 | B2* | 10/2009 | Allweier | 356/237.4 |
| 7,724,402 | B2* | 5/2010 | Ichikawa et al. | 358/474 |
| 7,773,802 | B2* | 8/2010 | Komiya et al. | 382/162 |
| 2004/0155949 | A1* | 8/2004 | Masuda | 347/115 |
| 2004/0178760 | A1* | 9/2004 | Kobayashi et al. | 318/483 |
| 2005/0001900 | A1* | 1/2005 | Kreh et al. | 348/87 |
| 2005/0093813 | A1* | 5/2005 | Yamamoto et al. | 345/102 |
| 2005/0105142 | A1* | 5/2005 | Okamoto | 358/474 |
| 2006/0187676 | A1* | 8/2006 | Ishikura | 362/615 |
| 2006/0256341 | A1* | 11/2006 | Kuwada | 356/445 |

FOREIGN PATENT DOCUMENTS

| JP | A-06-070097 | 3/1994 |
| JP | 10-065874 | 3/1998 |

* cited by examiner

*Primary Examiner* — Negussie Worku

(74) *Attorney, Agent, or Firm* — Morgan, Lewis & Bockius LLP

(57) ABSTRACT

A device includes: a first lighting unit that illuminates an object at a first incident angle; a second lighting unit that illuminates an object at a second incident angle, the second incident angle being larger than the first incident angle; an image-input unit that receives light and generates image signals in accordance with the received light; and a guiding unit that guides light diffusely reflected from the object illuminated by either the first lighting unit or the second lighting unit to the image-input unit.

12 Claims, 4 Drawing Sheets g

IMAGE-INPUT DEVICE

This application claims the benefit of Japanese Patent Application No. 2005-91807 filed in Japan on Mar. 28, 2005, which is hereby incorporated by reference.

BACKGROUND OF THE INVENTION

1. Field of the Invention

The present invention relates to obtaining information from an object having a non-flat surface.

2. Description of the Related Art

Surfaces of objects have many different textures. For example, a surface of polished metal has a smooth and glossy texture.

When an object having a non-flat surface is scanned to generate image data, image data will be generated with blur due to the non-flatness. For, example, when a photograph to be scanned is covered with a wrinkled transparent film in a photo album, image data of the photograph will be blurred due to wrinkled portions of the transparent film.

FIG. 9 illustrates an enlarged cross-section of a photograph P and a transparent film F covering the photograph P, and illustrates reflection from the transparent film F in a scanner.

As shown in FIG. 9, there exist intermittent pockets of air between a photograph P and a transparent film F. These pockets cause the surface of the transparent film F to wrinkle.

When a light L1 from a light source impinges on a transparent film F and a photograph P, light is reflected both from the surface of the transparent film F and the surface of the photograph P. The reflected light is guided to an image-input element such as a CCD (Charge Coupled Device) with guiding members (not shown).

In the example of FIG. 9, a specularly reflected light from the region F' of the transparent film F is guided to the image-input element. Since the intensity of the specularly reflected light is extremely high, the image-input element may be saturated. Accordingly white blurs are generated in the image data. Here, a specularly reflected light means is a light reflected from an object at a reflection angle, which is approximately the same as an incident angle.

The surface of the transparent film F, in particular, is finished to a high level of smoothness when seen microscopically, which means the degree of glossiness is high, thereby raising even further the light intensity level of the specularly reflected light. Often, in photocopiers, the light intensity level of the reflected light from a white reference board is set as a reference level, and any image signals with a light intensity level which exceeds the reference level are treated as image signals signifying white (so-called "shading correction"). Accordingly, the region F', which corresponds to the reflected light with a high intensity level as described above, appears as several white stripes on the final output image. Thus, an operator is unable to successfully photocopy a photograph as desired.

SUMMARY

According to an aspect of the present invention, a device is provided including a first lighting unit that illuminates an object at a first incident angle; a second lighting unit that illuminates an object at a second incident angle, the second incident angle being larger than the first incident angle; an image-input unit that receives light and generates image signals in accordance with the received light; and a guiding unit that guides light diffusely reflected from the object illuminated by either the first lighting unit or the second lighting unit to the image-input unit.

BRIEF DESCRIPTION OF THE DRAWINGS

Exemplary embodiment(s) of the present invention will be described in detail based on the following figures, wherein.

DETAILED DESCRIPTION

Figure 1:
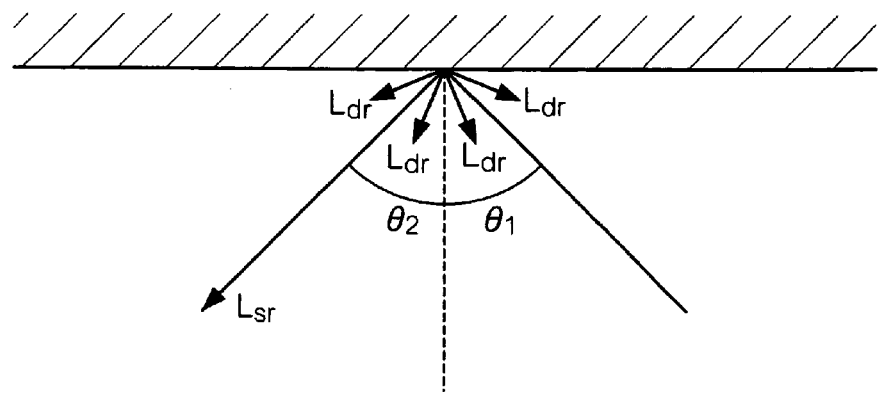
FIG. 1 is a conceptual view illustrating how light is reflected from an object.

Before giving a description of exemplary embodiments of the present invention, a simple explanation of incident light and reflected light is given. FIG. 1 is a conceptual view illustrating how light is reflected from an object. Generally, light impinging on an object at incidence angle $\theta_1$ is reflected at reflection angle $\theta_2$, which is equal to incidence angle $\theta_1$ (the Law of Reflection). In actuality, however, the incident light does not reflect only at reflection angle $\theta_2$, but often at various different angles. This is because the reflecting surface is often not necessarily smooth, but rather has a certain amount of unevenness. If the reflecting surface has unevenness, then the incident light naturally reflects at many different angles according to that unevenness. Here, when looking at the reflecting surface macroscopically, reflection in which light is reflected at approximately the same angle from the reflecting surface as the incidence angle, is called "specular reflection," and light thus reflected is called "specularly reflected light." Reflection in which light is reflected at a variety of angles from the reflecting surface irrespective of the incidence angle of the incident light is called "diffuse reflection" and light thus reflected is called "diffusely reflected light." Note that generally, the more specular reflection components an object contains in light reflected from its surface, the more intense the glossiness of that surface is. In other words, the degree of glossiness of an object depends on the microscopic surface quality of the surface (the reflecting surface), and the smoother it is microscopically, the greater the glossiness. In FIG. 1, the symbol $L_{sr}$ is assigned to the light path expressing specularly reflected light, while the symbol $L_{dr}$ is assigned to the light path expressing diffusely reflected light.

Figure 2:
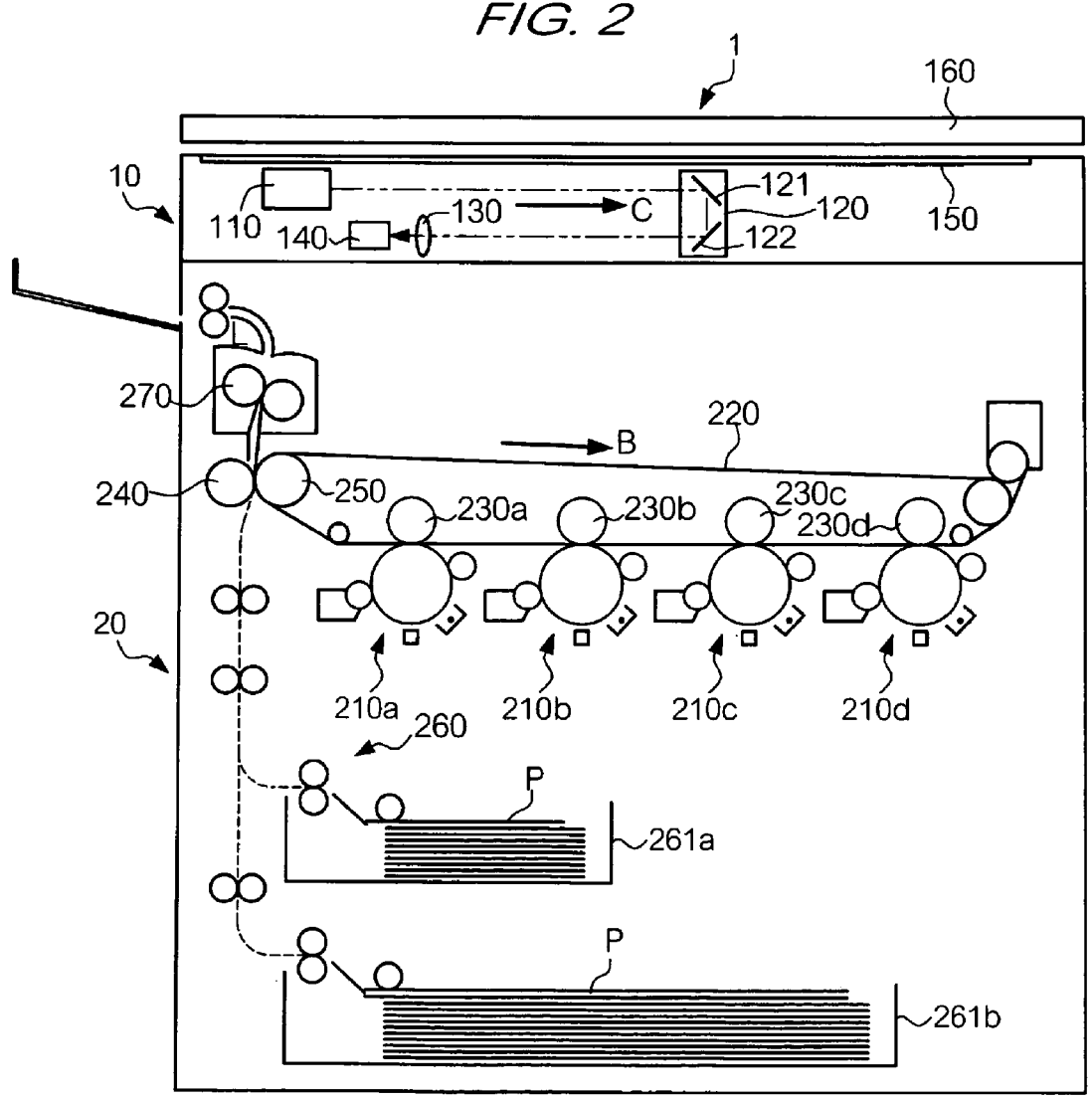
FIG. 2 is a block diagram illustrating a device configuration of an image-forming device according to an exemplary embodiment of the present invention.

FIG. 2 is a view illustrating a device configuration of an image-forming device 1 according to an exemplary embodiment of the present invention. The image-forming device 1 is broadly divided into an image-reading unit 10 that reads an object and generates image data, and an image-forming unit 20 that forms a toner image on a recording medium such as paper based on the image data. The image-reading unit 10 is equivalent to a so-called scanner and the image-forming unit 20 is equivalent to a so-called printer. In other words, the image-forming device 1 is a so-called multifunction device with the functions of a scanner and a printer.

The image-reading unit 10 is provided with a full-rate carriage unit 110, a half-rate carriage unit 120, a focusing lens 130, a line sensor 140, a platen glass 150, and a platen cover 160. The full-rate carriage unit 110 is driven by a driving unit (not shown) and reads an object O while moving at a velocity v in the direction of the arrow C in FIG. 2. (This operation is hereafter called a "scanning operation".) The half-rate carriage unit 120 is provided with mirrors 121 and 122, and directs light from the full-rate carriage unit 110 to the focusing lens 130. The half-rate carriage unit 120 is driven by a driving unit (not shown) and moves in the same direction as the full-rate carriage unit 110 at half the velocity of the full-rate carriage unit 110 (i.e., v/2). The focusing lens 130 has, for example, an fθ lens. The focusing lens 130 is disposed between the mirror 122 and the line sensor 140, and focuses light from the object O to the line sensor 140. The focusing lens 130 is not limited to a single-lens configuration, and may contain a variety of members. In this exemplary embodiment, mirrors, lenses, and so on present along a light path of reflected light are collectively called the "guiding unit."

The line sensor 140 is an image input unit that receives imaged light, and generates and outputs image signals in accordance with that light, and is, for example, plural rows of CCD image sensors (an image-input element series) provided with an on-chip color filter. In this exemplary embodiment, image sensors are used which can input images in four colors: B (blue), BG (blue-green), G (green), and R (red). The line sensor 140 outputs image signals in these four colors at eight bits for each color.

The platen glass 150 is a glass panel which is transparent and flat, and on which the object O to be read is placed. A reflection-suppressing layer, such as, for example, a multi-layer dielectric film, is formed on both sides of the platen glass 150, thus reducing reflection on the surfaces of the platen glass 150. The platen cover 160 is disposed such that it covers the platen glass 150, blocking outside light and making easier reading the object O which is placed on the platen glass 150.

Thus configured, in the image-reading unit 10 the full-rate carriage unit 110 illuminates the object O placed on the platen glass 150, and reflected light from the object O is read by the line sensor 140 via the mirrors 121 and 122. The line sensor 140 supplies image signals in the four colors B (blue), BG (blue-green), G (green), and R (red) to an image-processing unit 50, which is described below, based on the reflected light which is read. The image-processing unit 50 generates image data based on the image signals and provides it to the image-forming unit 20.

A configuration of the above-mentioned full-rate carriage unit 110 is described next.

Figure 3:
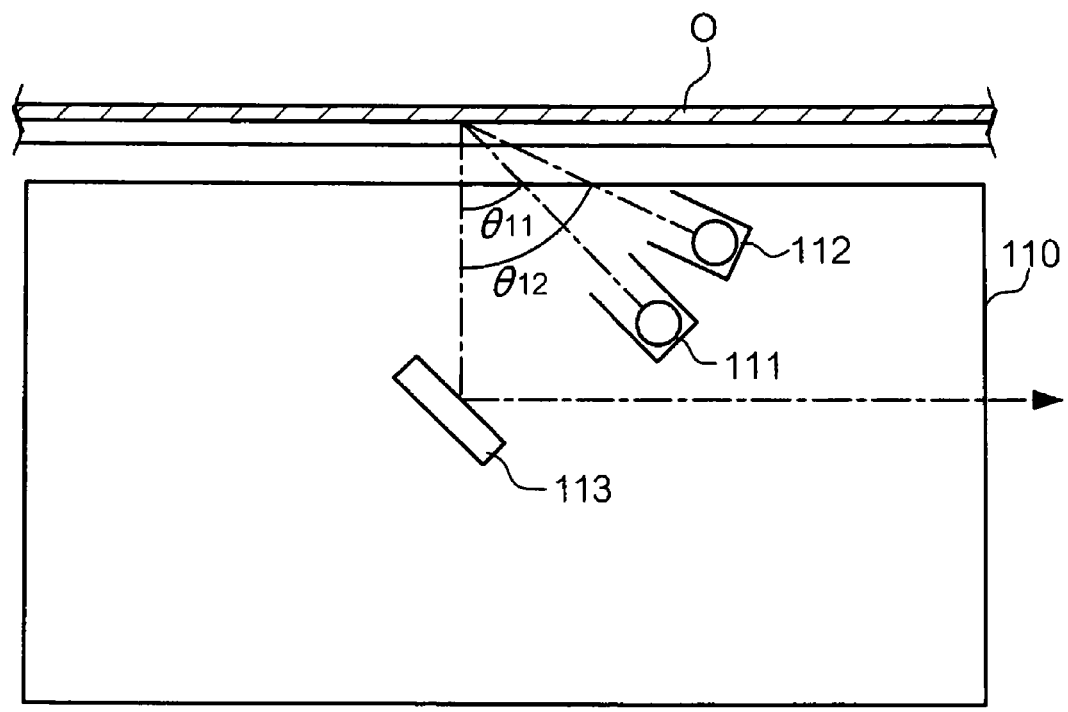
FIG. 3 is a view illustrating a configuration of a full-rate carriage unit of the image-forming device according to the same exemplary embodiment.

Here, FIG. 3 is a view illustrating details of a configuration of the full-rate carriage unit 110. As shown in FIG. 3, the full-rate carriage unit 110 is provided with a first light source 111, a second light source 112, and a mirror 113. The first light source 111 and the second light source 112 are, for example, tungsten halogen lamps or xenon arc lamps. The first light source 111 is disposed in a position such that it illuminates the object O at incident angle $\theta_{11}$=45 degrees. In contrast, the second light source 112 is disposed in a position such that it illuminates the object O at incident angle $\theta_{12}$=approximately 65 degrees.

The mirror 113 reflects the reflected light from the object O, which is illuminated by the first light source 111 or the second light source 112, and directs the light to the half-rate carriage unit 120. The mirror 113 is positioned such that the reflected light impinges on the object O, whose surface is flat, at a reflection angle of approximately 0 degrees. Accordingly, when light impinges on an object whose surface is flat (e.g., ordinary paper, etc.) at an incident angle of $\theta_{11}$=45 degrees, no specularly reflected light is contained in the reflected light which reflects to the mirror 113 from the object O, so there is only diffusely reflected light. Diffuse reflection components in the reflected light from the object O can therefore be read from the light reflected by the mirror 113. In the foregoing description, an incident angle and a reflection angle are defined assuming that the surface of an object is flat.

Figure 9:
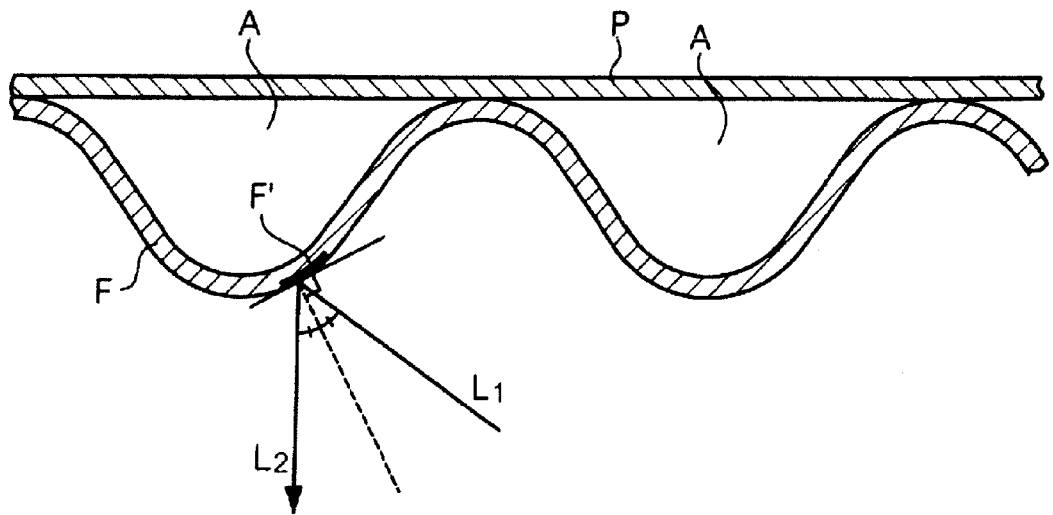
FIG. 9 is a view illustrating reflected light when light impinges on an object whose surface is non-flat.

In contrast, if light impinges on an object whose surface is non-flat (e.g., a photograph covered with a wrinkled transparent film in a photo-album) at an incident angle of $\theta_{11}$=45 degrees, the reflected light reflected from the surface of the object O contains specular reflection components from the surface (the transparent film) of the object, for the reasons described in FIG. 9. The intensity level of the reflected light therefore exceeds the reference level established during shading correction, and appears as white-stripe regions in the output image.

Accordingly, this exemplary embodiment reduces the specular reflection components contained in the reflected light by increasing the incident angle. In other words, light impinges on the object O using the second light source 112 for which the incident angle is set larger than for the first light source 111.

The reason a larger incident angle reduces the specular reflection components will be described below.

Figure 4:
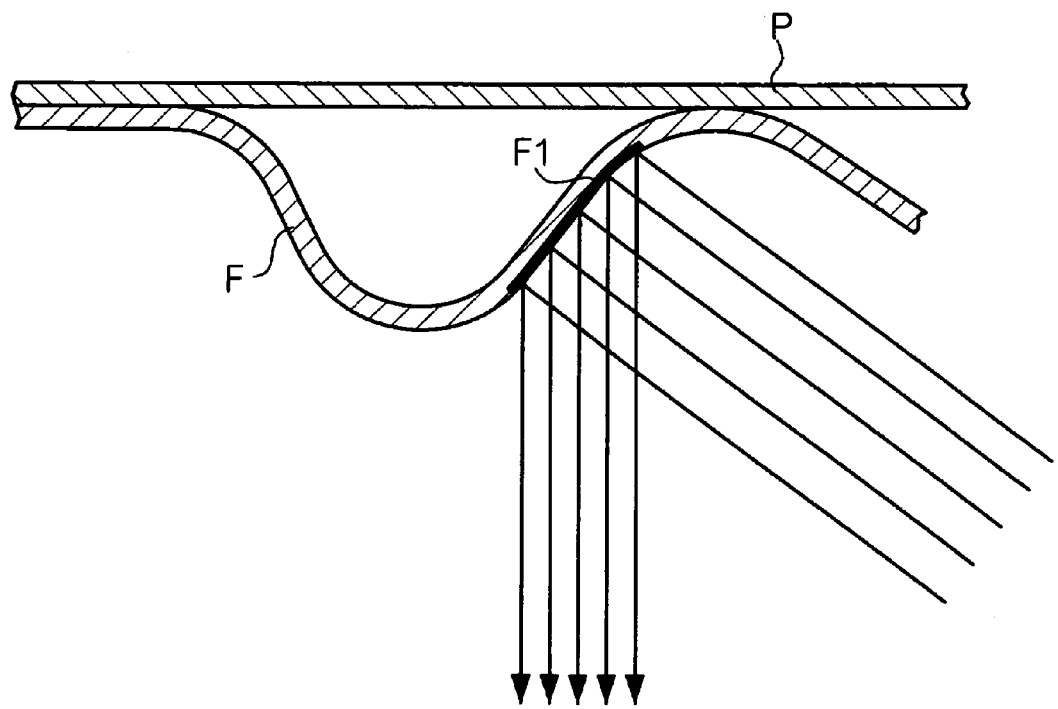
FIG. 4 is a view illustrating reflected light when light impinges on an object whose surface is non-flat.

FIG. 4 is a cross-section illustrating reflections of light at an incident angle of 45 degrees from a wrinkled transparent film covering a photo-album. Taking into consideration the shape of the region F1 of the transparent film F, light is specularly reflected from the region F1 in the direction of the mirror 113. Since the region F1 is relatively wide, the intensity of the light reflected from the region F1 and guided by the mirror 113 to the image-input elements becomes extremely high.

Figure 5:
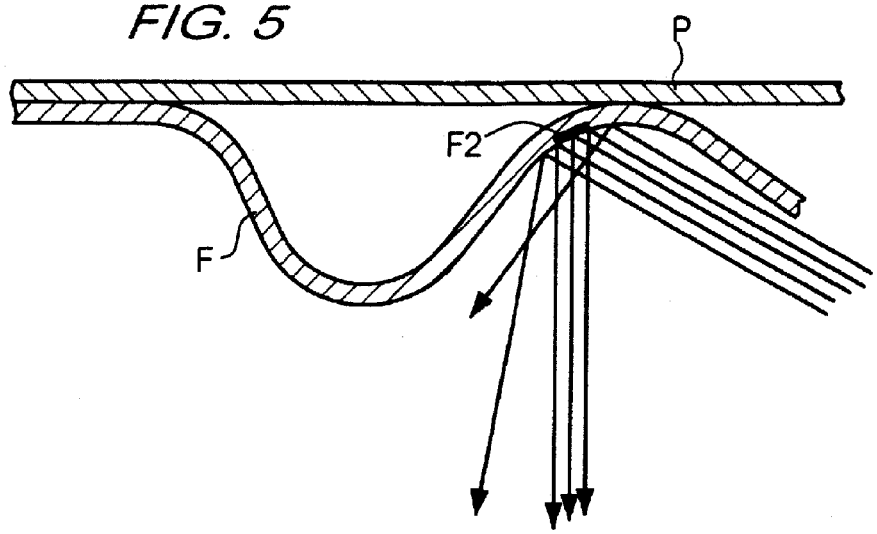
FIG. 5 is a view illustrating reflected light when light impinges on an object whose surface is non-flat.

In contrast, FIG. 5 is a cross-section illustrating reflections of light at an incident angle of 65 degrees from a wrinkled transparent film covering a photo-album. As shown in FIG. 5, when the incident angle becomes larger, the region F2, from which light is specularly reflected in the direction of the mirror 113, becomes smaller. Accordingly, the specular reflection components contained in the light reflected to the mirror 113 are decreased compared to when an incident angle of 45 degrees is used.

This is why increasing the incident angle reduces the specular reflection components.

Returning to FIG. 2, a configuration of the image-forming unit 20 is described. As shown in FIG. 2, the image-forming unit 20 is provided with image-forming units 210a, 210b, 210c, and 210d, an intermediate image transferring belt 220, first image transferring rolls 230a, 230b, 230c, and 230d, a second image transferring roll 240, a back-up roll 250, a paper feed unit 260, and a fixing unit 270. The intermediate image transferring belt 220 is configured as an endless belt member, and is driven in the direction of the arrow B in the figure by a driving unit (not shown). The first image transferring rolls 230a, 230b, 230c, and 230d are biased toward the side of photosensitive drums on the image-forming units 210a, 210b, 210c, and 210d via the intermediate image transferring belt 220. Toner images are formed on these photosensitive drums, and the toner images are transferred to the intermediate image transferring belt 220. The second image transferring roll 240 and the back-up roll 250 are mutually biased at a position at which the intermediate image transferring belt 220 faces recording paper P, and transfers the toner image from the intermediate image transferring belt 220 to the recording paper P. The paper feed unit 260 is provided with paper trays 261*a* and 261*b*. Paper trays 261*a* and 261*b* may hold various kinds of recording papers P and each feeds recording paper P during image formation. The fixing unit 270 is provided with a roll member for heating and applying pressure to the recording paper P, fixing the toner image transferred to the surface of the recording paper P with heat and pressure. In this way, the image-forming unit 20 forms images on the recording paper P using toners of various colors.

Next, a functional configuration of the above-mentioned image-forming device 1 is described.

Figure 6:
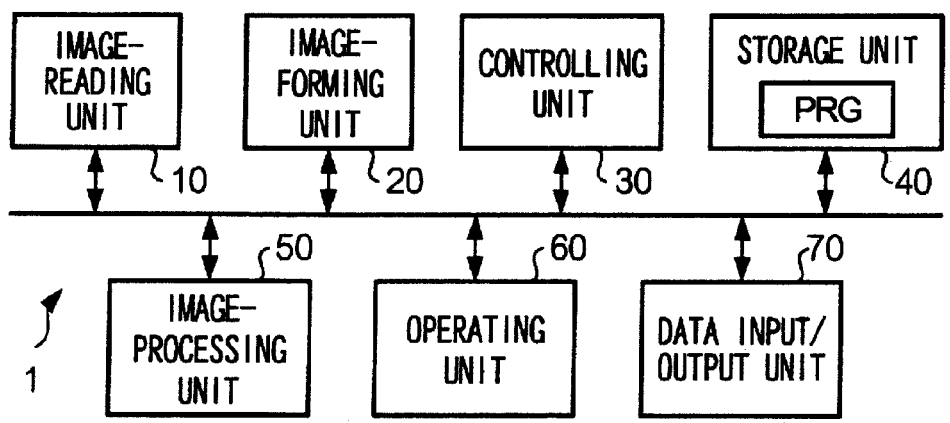
FIG. 6 is a view illustrating functional components of the image-forming device.

FIG. 6 is a block diagram illustrating a functional configuration of the image-forming device 1. In addition to the above-mentioned image-reading unit 10 and the image-forming unit 20, the image-forming device 1 has a controlling unit 30, a storage unit 40, an image-processing unit 50, an operating unit 60, and a data input/output unit 70.

The controlling unit 30 is a computing device provided with a CPU (Central Processing Unit), a RAM (Random Access Memory), a ROM (Read Only Memory), and so on, which are not shown, and controls operations of various units of the image-forming device 1 by executing a variety of programs PRG stored in the storage unit 40. The storage unit 40 is, for example, a large-capacity storage device such as a HDD (Hard Disk Drive) and stores the variety of programs PRG for operating the above-mentioned various units of the image-forming device 1. The image-processing unit 50 is provided with plural image-processing circuits such as an ASIC (Application Specific Integrated Circuit) or an LSI (Large Scale Integration), image memory for temporarily storing image data, and so on, and each image-processing circuit executes prescribed image processes. The image-processing unit 50 performs various image processes and generates image data based on image signals generated by the image-reading unit 10 and outputs this to the image-forming unit 20.

The operating unit 60 is provided, for example, with a touch-panel display, various types of buttons, and so on, to which instructions by an operator of the image-forming device 1 are input. The input instructions are supplied to the controlling unit 30. The data input/output unit 70 is an interface device for transmitting data back and forth with external devices. The image-forming device 1 can, as needed, supply image data which is output to the image-forming unit 20 to external devices such as a computer, a printer, and so on.

The operating modes of the image-forming device 1 include two types: a first operating mode and a second operating mode. The controlling unit 30 functions as a unit for switching between these modes. The display of the operating unit 60 is such that a screen is displayed for selecting the operating mode, and the operator selects the desired operating mode from the screen display. The controlling unit 30 switches between these operating modes according to the selection made by the operator.

The first operating mode is an operating mode for reading objects whose surfaces are flat. In the first operating mode, a scan operation is performed by illuminating the object O by the first light source 111. Specifically, the first light source 111 irradiates the object O. At this time the second light source 112 is turned off. When the full-rate carriage unit 110 moves in the direction of the arrow C in FIG. 2 in this state, the first light source 111 illuminates the entire surface of the object O and the reflected light is read by the line sensor 140. As a result, image signals are generated by the line sensor 140 and output to the image-processing unit 50. The image-processing unit 50 performs the prescribed image processes on the image signals and supplies them to the image-forming unit 20. The image-forming unit 20 forms an image on the recording paper P using toner of each color based on the image data.

The second operating mode is an operating mode for reading objects whose surfaces are non-flat. In the second operating mode, a scanning operation is performed by illuminating the object O by the second light source 112. Specifically, the first light source 111 is turned off and the second light source 112 irradiates the object O. When the full-rate carriage unit 110 moves in the direction of the arrow C in FIG. 2 in this state, the second light source 112 illuminates the entire surface of the object O and the reflected light is read by the line sensor 140. As a result, image signals are generated by the line sensor 140 and output to the image-processing unit 50. The image-processing unit 50 performs the prescribed image processes on the image signals and supplies them to the image-forming unit 20. The image-forming unit 20 forms an image on the recording paper P using toner of each color based on the image data.

As described above, when reading the object O whose surface is non-flat, the specular reflection components contained in the reflected light are reduced by increasing of the incident angle of the light to the object O. Generation of white regions on photocopies due to the specular reflection components contained in the reflected light may be suppressed accordingly.

MODIFICATIONS

The process in which the controlling unit 30 switches between the operating modes can be modified as follows.

(1) The controlling unit 30 may first perform a pre-scan in the first operating mode on the object O and determine whether to switch to the second operating mode based on the results.

Specifically, the controlling unit 30 first causes the first light source 111 to illuminate the object O, as in the pre-scan in the first operating mode, and causes the line sensor 140 to generate image signals. The controlling unit 30 then analyzes the image signals generated by the line sensor 140 during the pre-scan and compares the intensity level expressed by the image signals with the reference level specified by the light reflected from the white reference board or the like. If the intensity level expressed by the image signals is larger than the reference level here, this means that specular reflection components of an appropriate level are contained in the light reflected from the object O. Accordingly, the controlling unit 30 switches from the first operating mode to the second operating mode and once again performs the scan operation. In this case, although the pre-scan must first be performed, the inconvenience for the operator of having to perform the operation of switching between the operating modes is eliminated, and the operator does not need to select an operating mode to be used.

Figure 7:
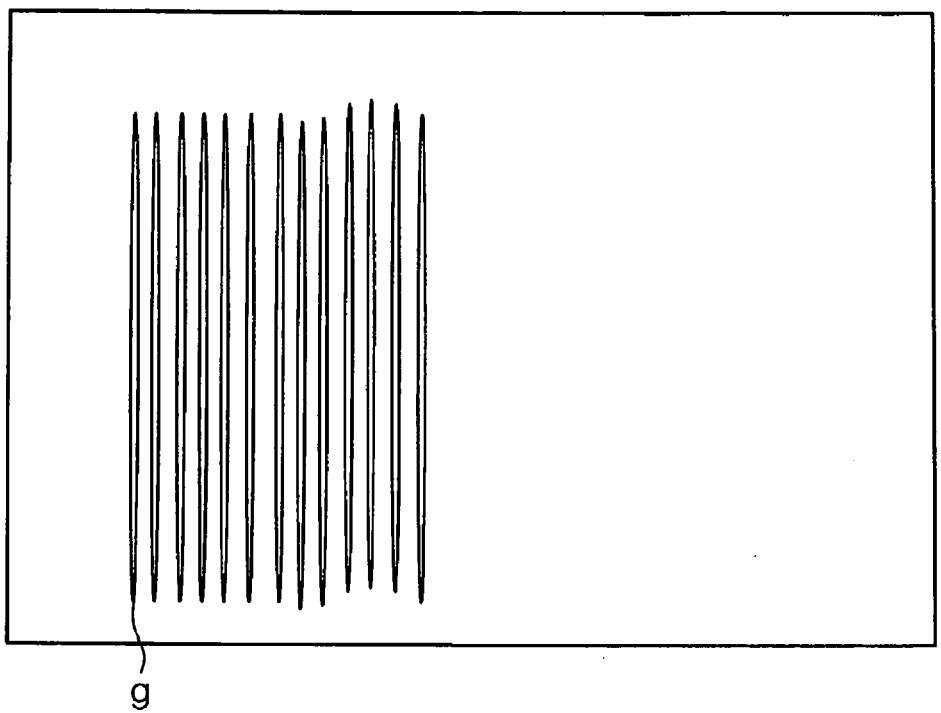
FIG. 7 is a view illustrating white regions caused by wrinkles on the surface of an object.

(2) Unlike modification 1, in which the need for switching between the operating modes is determined by the controlling unit 30 based on the image signals output from the line sensor 140, it is possible to determine the need to switch between the operating modes based on the image data generated by the image-processing unit 50. Specifically, the controlling unit 30 first causes the first light source 111 to illuminate the object O as the pre-scan in the first operating mode, causes the line sensor 140 to generate image signals, and then further causes the image-processing unit to generate image data for the entire object. The controlling unit 30 then performs an image analysis on the generated image data, and determines whether multiple white regions extend at least a prescribed length in a constant direction in the image. In other words, the white regions which are in the shape of wrinkles on the surface of the object O appear as white region g as shown in FIG. 7, so if the controlling unit 30 detects this kind of white region, it switches from the first operating mode to the second operating mode and once again performs the scanning operation. In this case, although the pre-scan must first be performed, the inconvenience for the operator of having to perform the operation of switching between the operating modes is eliminated, and the operator does not need to select the operating mode. Moreover, the determination of the need to switch between the operating modes can be performed more accurately than in modification 1.

(3) The following is also possible in the above-mentioned modification 1 or modification 2.

Figure 8:
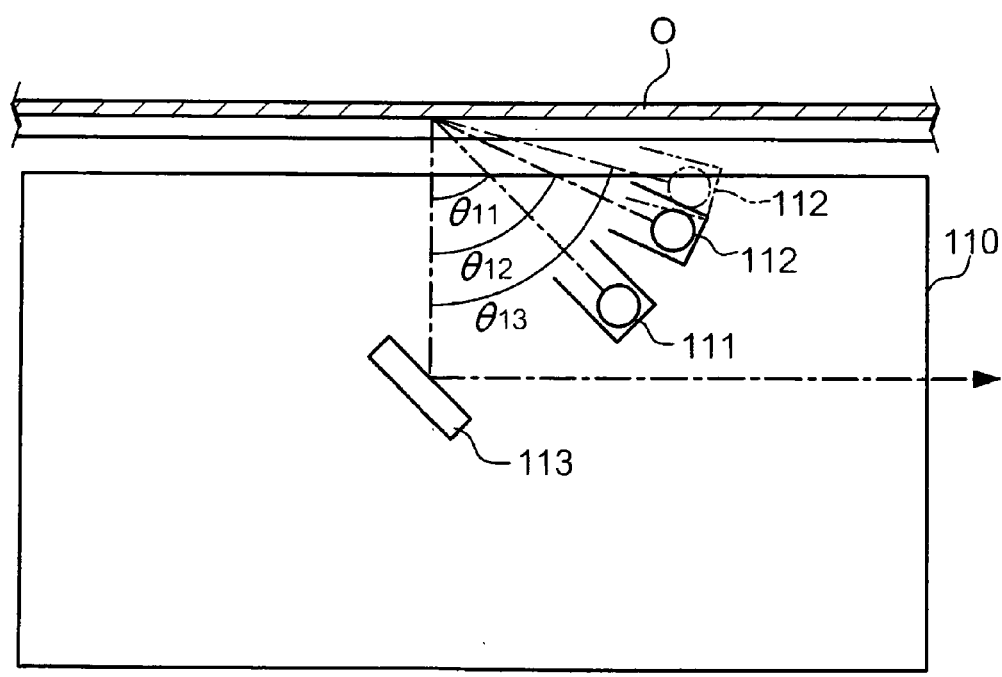
FIG. 8 is view illustrating a variation of the full-rate carriage.

FIG. 8 is a view illustrating a configuration of the full-rate cartridge 110 in modification 3. The full-rate cartridge 110 is provided with an incident angle varying unit that varies the incident angle with respect to the object O by moving the second light source 112 between a position shown by the solid line (an incident angle of $\theta_{12}$) and a position shown by the dash-dotted line (an incident angle of $\theta_{13}$). Specifically, the controlling unit 30 controls the drive of a motor by meshing various gears in the motor's drive axle, thereby moving the second light source 112 to any position between the solid-line position and the dash-dotted-line position. In modifications 1 and 2, after a scan operation in the second operating mode is performed at, for example, an incident angle of 60 degrees, the controlling unit 30 once again determines whether specular reflection components are contained in the light reflected from the object O, based on either the image signals or the image data. If, as a result of this determination, it is determined that specular reflection components are still contained in the light reflected from the object O, then the controlling unit 30 increases the incident angle larger than 60 degrees, and once again performs the scanning operation in the second operating mode at, for example, an incident angle of 65 degrees. Thereafter, in the same procedure, the controlling unit 30 performs the scanning operation while gradually increasing the incident angle until it determines that no specular reflection components are contained in the reflected light from the object. The closer the incident angle is to 45 degrees, the more suited it is to the reading process of the image itself. Accordingly, in modification 3, favorably reading an object is possible within a range in which white regions are not created on output images.

(4) A variety of configurations can be adopted for the full-rate cartridge. First, the position of the light sources is not limited to the exemplary embodiments described above, and the incident angle of the first light source need only be an angle at which objects whose surface is flat can be favorably read; approximately 45 degrees is desirable, but may vary from 45 degrees by 1 degrees to 2 degrees. The incident angle of the second light source need only be larger than the incident angle of the first light source, and favorably is desired to be within a range approximately between 60 degrees and 70 degrees.

(5) In the above exemplary embodiments, the line sensor 140 was described as multiple rows of CCD image sensors provided with an on-chip color filter, but the present invention is not limited to this configuration. For example, the image-input unit may be a single row of image sensors in a configuration provided with a sliding or rotating color filter. With such a configuration, the line sensor may be configured more inexpensively. However, when the number of colors to be handled increases, then an increased times of reading operations have to be performed. The number of colors read by the line sensor is not limited to four colors, and may be five or more colors. A higher number of colors makes it possible to estimate spectral reflectance more accurately, but when the amount of data in the generated image signals and the image-processing time are taken into consideration, around four to six colors is appropriate.

(6) In the exemplary embodiments described above, a tandem-type image-forming unit provided with four image-forming units is described, but a rotary-type image-forming unit is also possible. Further, a paper transporting belt may be provided in lieu of the intermediate image transferring belt, and images may be transferred directly to the recording paper from the photosensitive drum, and not from an intermediate image transferring body (the intermediate image transferring belt).

(7) Note also that, in the exemplary embodiments described above, a case in which the present invention is used as an image-forming device is described, but such an aspect is not a limitation. For example, just as an image-input device (a scanner) is provided with a configuration equivalent to the image-reading unit of the exemplary embodiments, a certain effect can be achieved without providing the image-forming unit. In other words, the present invention can be specified as this kind of image-input device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device comprising:
   a first lighting unit that illuminates an object at a first incident angle;
   a second lighting unit that illuminates an object at a second incident angle, the second incident angle being larger than the first incident angle;
   an image-input unit that receives light and generates image signals in accordance with the received light;
   a guiding unit that guides light diffusely reflected from the object illuminated by either the first lighting unit or the second lighting unit to the image-input unit; and
   a mode switching unit that switches between a first operating mode in which the first lighting unit illuminates an object and a second operating mode in which the second lighting unit illuminates an object.

2. The device according to claim 1, wherein the first incident angle is approximately 45 degrees and the second incident angle is approximately between 60 degrees and 70 degrees.

3. The device according to claim 1, comprising an input unit to which instructions from an operator are input; and wherein the mode switching unit switches between the first operating mode and the second operating mode based on an instruction input to the input unit.

4. The device according to claim 1, wherein the mode switching unit comprises:
   a pre-scanning unit that illuminates the object in the first operating mode as a pre-scan; and
   a determining unit that determines the result of the pre-scan performed by the pre-scanning unit; and wherein
   the mode switching unit switches to the second operating mode based on the determination result.

5. The device according to claim 4, wherein:
   the image-input unit generates image signals based on the pre-scan;
   the determining unit analyzes the image signals and compares an intensity level expressed by the image signals with a reference level; and
   the mode switching unit switches to the second operating mode when the intensity level expressed by the image signals is greater than the reference level.

6. The device according to claim 5, comprising:
   an incident angle varying unit that varies the second incident angle, wherein,
   after the second operating mode is switched to, the determining unit analyzes the image signals generated by the image-input unit and compares the intensity level expressed by the image signals with the reference level, and when the intensity level expressed by the image signals is greater than the reference level, the incident angle varying unit increases the second incident angle.

7. The device according to claim 1, further comprising an image data generating unit that generates and outputs image data expressing an object based on image signals generated by the image-input unit.

8. The device according to claim 7, wherein the first incident angle is approximately 45 degrees and the second incident angle is approximately between 60 degrees and 70 degrees.

9. The device according to claim 7, wherein the mode switching unit comprises:
   a pre-scanning unit that illuminates the object in the first operating mode as a pre-scan; and
   a determining unit that determines the result of the pre-scan performed by the pre-scanning unit; and wherein
   the mode switching unit switches to the second operating mode based on the determination result.

10. The device according to claim 9, wherein:
    the image data generating unit generates image data based on the pre-scan; and
    the determining unit analyzes the image data and determines whether white regions greater than a prescribed area are present; and
    when white regions greater than a prescribed area are determined to be present, switches to the second operating mode.

11. The device according to claim 10, wherein the white regions greater than a prescribed area are made up of a plurality of white regions greater than a prescribed length extending in a certain direction.

12. The device according to claim 10, comprising:
    an incident varying unit that varies the second incident angle; and wherein,
    after the second operating mode has been switched to, the determining unit analyzes image data generated by the image data generating unit and determines whether white regions greater than a prescribed amount are present, and, when the determination is affirmative, the incident angle varying unit increases the second incident angle.

* * * * *